Patented Aug. 14, 1945

2,382,881

UNITED STATES PATENT OFFICE 2,382,881

ISOMERIZATION OF SATURATED HYDROCARBONS

Vladimir N. Ipatieff and Herman Pines, Riverside, Ill., assignors to Universal Oil Products Company, Chicago, Ill., a corporation of Delaware No Drawing. Application March 3, 1943, Serial No. 477,880

7 Claims. (Cl. 260—683.5)

This application is a continuation-in-part of our co-pending application Serial #386,111, filed March 31, 1941 which is a continuation-in-part of our co-pending application Serial #328,321, filed April 6, 1940, which has issued as Patent No. 2,353,899, July 18, 1944 and which in turn is a continuation-in-part of our application Serial #238,066 which was filed October 31, 1938.

The present invention relates to the treatment of saturated hydrocarbons to produce isomers thereof which are in general more reactive chemically. The process involves the use of special catalysts and particular conditions of operation which favor isomerization so that the desired isomers are produced efficiently and in relatively high yields.

This invention is applicable to the treatment of normal butane and normally liquid paraffin hydrocarbons which are capable of isomerizing under properly regulated conditions of treatment. It is also applicable to the treatment of hydrocarbon mixtures containing substantial quantities of paraffins and naphthenes such as, for example, straight run gasolines or fractions thereof. Straight run gasoline fractions having a low antiknock value may be converted into valuable motor fuels having a high anti-knock value by treatment in accordance with the process herein disclosed.

In one specific embodiment, the present invention comprises a process for the conversion of isomerizable saturated hydrocarbons to produce isomers thereof which comprises subjecting said hydrocarbons in the presence of a hydrogen halide to contact with a catalyst composite comprising a mixture of an aluminum halide and zirconium halide, said mixture being brought to a state of fusion prior to its use.

The feature of the present invention is broadly based on the finding that when composites of an aluminum halide and a zirconium halide are employed in the isomerization of saturated hydrocarbons, better results are obtained when the mixture of halides have been fused prior to its use. Later examples, presented herein, will indicate the exact extent of this benefit. In view of the present stage of knowledge as to the mutually co-operative effect in mixed catalyst composites, it is difficult to form a basis for explaining the better results observed when using previously fused mixtures of these halides than when using unfused mixtures. One possible explanation for the improved results obtained when utilizing the previously fused mixture is the fact that during the fusion, the zirconium halides and aluminum halides are miscible and upon cooling, a catalyst is formed having the more active aluminum halides evenly distributed throughout the entire catalyst mass. It is also probable that in some instances, there is a chemical interaction of the metal halides to form salts of definite composition which function as the real catalyst. It has also been found that the selectivity of the catalyst may be increased by the addition of minor amounts of the halides of sodium, potassium and calcium to the catalyst composite.

The term "halides" as used in this specification and appending claims is intended to include only the chlorides, bromides and iodides, since extensive experimentation has indicated that the fluorides have substantially no catalytic activity for the isomerization reaction.

In preparing catalyst composites of the present type, the metal halides are mixed in regulated proportions and preferably in finely divided states and heated to a temperature above the fusing point of the mixture under superatmospheric pressure, if necessary, to prevent volatilization of any of the more volatile ingredients such as, for example, aluminum chloride. The material produced is then granulated and may then be used either in batch operations in which it is suspended in the hydrocarbons to be isomerized or as a filler in reaction tubes or chambers through which the hydrocarbons are passed. It is essential that the isomerizable hydrocarbons contact the composite catalyst in the presence of a hydrogen halide or compounds generating a hydrogen halide in situ which acts as a promoter for the isomerization reaction. Undesirable decomposition reactions are substantially reduced by the use of hydrogen pressure in the reaction zone. As will be shown in later examples, the catalyst composites prepared by the method described above show definitely better results in promoting the isomerization reaction than mechanical mixtures of the two salts in the same proportions, no matter how finely divided or how intimately mixed without fusion. The temperatures which may be employed in effecting the isomerization reaction in accordance with the present invention, extend over a considerable range depending upon the proportions of the individual metallic halides present in the catalyst shown and the type of operation employed. Temperatures from ordinary atmospheric of about 20° C. to as high as 300° C. and superatmospheric pressures up to 500 pounds or more may be employed. The preferred temperatures for the operation will fall within the range of approximately 50 to 200° C.

Batch operations are conducted in vessels of suitable construction for withstanding the operating pressures and equipped with mechanical stirring devices to insure good contact of the catalyst particles with the hydrocarbons. The time of contact will vary somewhat with the temperature used and the efficiency of the contact with the catalyst. After completion of the treatment the vessel may be cooled and the hydrocarbon products fractionated to recover the desired isomers from the unconverted materials which may be subjected to further isomerization treatment. Continuous operations may be conducted by placing the granular catalytic material in reaction tubes and passing the hydrocarbons either in vapor, liquid or mixed phase over the granular material in the presence of a hydrogen halide and the reaction products removed from the isomerization zone and introduced into subsequent fractionating equipment for the separation of the desired product.

Another type of operation which may be employed when using the catalyst of the present invention consists of suspending finely divided powdered catalyst in a stream of the hydrocarbons, said hydrocarbons being in either the liquid, vapor or mixed phase and passing the mixture through tubular or suitably baffled elements to maintain turbulence while heating the stream of reactants, catalysts and hydrogen halide to a selected conversion temperature. This conversion step will be followed by fractionation and separation as in the continuous method of operation already described and the separated catalyst may in some instances be recycled for further use.

The following examples are given to indicate the character of the results obtainable in the operation of the process without intending to limit the scope of the invention in exact correspondence with the data presented. Separate runs are shown to indicate the differences in the results obtained when utilizing some of the preferred catalytic materials which had been fused prior to use and a mechanical mixture of the two salts in the same proportion.

*Example I.*—A catalyst was prepared by compositing 25 parts by weight of aluminum chloride and 15 parts by weight of zirconium chloride by heating the ingredients in a pressure vessel at a temperature of about 200° C.

The granular catalyst was placed in the reactor and the vapors of normal pentane passed therethrough at a temperature of 150° C. in the presence of 5 parts by weight of hydrogen chloride by weight of the normal pentane.

As an average in a run of 4 hours 40% by weight of isopentane, 5% by weight of isobutane and 55% by weight of normal pentane were obtained. By recycling the unconverted normal pentane, an ultimate yield of 85% of isopentane was obtained.

A repetition of the above described experiment with a mechanical mixture of anhydrous aluminum and zirconium chloride in the same proportions gave the following yields of product.

| | Percent |
|---|---|
| Isobutane | 54.0 |
| N-butane | 8.0 |
| Isopentane | 20.0 |
| N-pentane | 8.0 |
| Heavier hydrocarbons | 10.0 |

Upon recycling, an ultimate yield of about 22% by weight of isopentane was obtained.

*Example II.*—Approximately the same weight of aluminum chloride as used in the previous example was placed in a reactor and the vapors of normal pentane passed therethrough at a temperature of 150° C. in the presence of 5 parts by weight of hydrogen chloride based on the weight of normal pentane charged. The following yields are obtained:

| | Percent |
|---|---|
| Isobutane | 43 |
| N-butane | 6 |
| Isopentane | 23 |
| N-pentane | 18 |
| Heavier hydrocarbons | 10 |

An ultimate yield of about 34% by weight was obtained by recycling the unconverted normal pentane.

It will be seen from the above comparative tests that much more selective results were obtained with the fused catalyst than with corresponding amounts of the mechanically mixed materials or aluminum chloride alone, since in the first instance, there was no formation of materials heavier than normal pentane and the yield of isopentane was 36% compared with 30% in the case of the mixed catalyst and 23% in the case of the aluminum chloride alone. Upon recycling, a greater difference in yield is seen, since about 85% of isopentane was obtained when using the fused catalyst and only 22% of isopentane when using the mechanical mixture and 34% when using aluminum chloride alone.

We claim as our invention:

1. A process for the conversion of an isomerizable saturated hydrocarbon to produce a substantial yield of isomers thereof which comprises subjecting said hydrocarbon under isomerizing conditions and in the presence of a hydrogen halide to contact with a composite catalyst comprising a previously fused mixture of halides of aluminum and zirconium, and recovering the resultant isomerized hydrocarbon.

2. A process for the conversion of an isomerizable saturated hydrocarbon to produce a substantial yield of isomers thereof which comprises subjecting said hydrocarbon at a temperature of from about 20 to about 300° C. to contact in the presence of a hydrogen halide with a previously fused mixture of halides of aluminum and zirconium, and recovering the resultant isomerized hydrocarbon.

3. A process for the isomerization of a paraffin hydrocarbon to produce a substantial yield of isomers thereof which comprises subjecting said hydrocarbon under isomerizing conditions and in the presence of a hydrogen halide to contact with a composite catalyst comprising a previously fused mixture of halides of aluminum and zirconium, and recovering the resultant isomerized hydrocarbon.

4. The process of claim 1 further characterized in that the composite catalyst comprises a previously fused mixture of aluminum chloride and zirconium chloride.

5. A process for the treatment of a hydrocarbon mixture of approximate gasoline boiling range and containing substantial quantities of paraffins to improve the antiknock properties thereof, which comprises subjecting said mixture to contact under isomerizing conditions and in the presence of a hydrogen halide with a composite catalyst comprising a previously fused mixture of halides of aluminum and zirconium, and recovering the isomerized mixture.

6. The process of claim 5 further characterized in that the composite catalyst comprises a previously fused mixture of aluminum chloride and zirconium chloride.

7. A process for the treatment of a hydrocarbon mixture of approximate gasoline boiling range and containing substantial quantities of paraffins to improve the antiknock properties thereof, which comprises subjecting said mixture to contact under isomerizing conditions in the presence of a hydrogen halide and hydrogen with a composite catalyst comprising a previously fused mixture of halides of aluminum and zirconium, and recovering the isomerized mixture.

VLADIMIR N. IPATIEFF.
HERMAN PINES.